(12) United States Patent
Sonobe et al.

(10) Patent No.: US 9,488,248 B2
(45) Date of Patent: Nov. 8, 2016

(54) ACTUATOR

(71) Applicants: MITSUBISHI HEAVY INDUSTRIES, LTD., Tokyo (JP); National University Corporation Fukushima University, Fukushima-shi, Fukushima (JP)

(72) Inventors: Hiroyuki Sonobe, Tokyo (JP); Fumio Inayoshi, Tokyo (JP); Hiroyuki Sasaki, Tsuruoka (JP); Takayuki Takahashi, Sendai (JP)

(73) Assignees: MITSUBISHI HEAVY INDUSTRIES, LTD., Tokyo (JP); NATIONAL UNIVERSITY CORPORATION FUKUSHIMA UNIVERSITY, Fukushima (JP)

( * ) Notice: Subject to any disclaimer, the term of this patent is extended or adjusted under 35 U.S.C. 154(b) by 0 days.

(21) Appl. No.: 14/423,623

(22) PCT Filed: Jul. 19, 2013

(86) PCT No.: PCT/JP2013/069621
§ 371 (c)(1),
(2) Date: Feb. 24, 2015

(87) PCT Pub. No.: WO2014/034320
PCT Pub. Date: Mar. 6, 2014

(65) Prior Publication Data
US 2015/0260261 A1    Sep. 17, 2015

(30) Foreign Application Priority Data

Aug. 29, 2012  (JP) .................. 2012-188662

(51) Int. Cl.
*F16H 1/32*        (2006.01)
(52) U.S. Cl.
CPC ................. *F16H 1/321* (2013.01); *F16H 1/32* (2013.01)

(58) Field of Classification Search
CPC .................................. F16H 1/32; F16H 1/321
USPC ..................................................... 475/163, 164
See application file for complete search history.

(56) References Cited

U.S. PATENT DOCUMENTS 1,611,981 A      12/1926  Amberg
3,675,539 A *    7/1972   Zajac .................... F03C 1/0605
                                                          91/477

(Continued)

FOREIGN PATENT DOCUMENTS

JP          52-39063 A       3/1977
JP          60-4647 A        1/1985

(Continued)

OTHER PUBLICATIONS

Uzuka et al., Development of Nutation Motors (1st Report, Driving Principle and Basic Characteristics of Pneumatic Nutation Motor), Japan Society of Mechanical Engineers monographs (Part C), vol. 72, No. 716, Monograph No. 05-0815, 2006, pp. 180-185 with English translation.

*Primary Examiner* — Roger Pang
(74) *Attorney, Agent, or Firm* — Birch, Stewart, Kolasch & Birch, LLP

(57) ABSTRACT

An actuator includes an output member having an output shaft (9) rotated about a rotation axis (Ar) thereof, a stationary crown gear (5) disposed at an input side of the output member and having a plurality of teeth disposed about the rotation axis in parallel, a wobbling crown gear (6) having a different number of teeth from stationary crown gear (5) about a central axis (Ac) and meshed with the stationary crown gear (5), a plurality of drivers (4) disposed at an input side of the wobbling crown gear (6) about the rotation axis in parallel in a circumferential direction and configured to displace a portion of the wobbling crown gear (6) corresponding thereto in the axial direction, and a stopper (5s) configured to come in contact with a portion of the wobbling crown gear (6) to restrict inclination of the wobbling crown gear (6) and configured to restrict a meshing depth of the stationary crown gear (5) and the wobbling crown gear (6).

11 Claims, 2 Drawing Sheets

(56) References Cited

U.S. PATENT DOCUMENTS 4,223,593 A * 9/1980 Kitayama ............. F01B 3/0002
  91/473
5,309,041 A * 5/1994 Kawai .................. H02K 41/065
  310/49.48
5,804,898 A * 9/1998 Kawai .................. H02K 41/065
  310/268

FOREIGN PATENT DOCUMENTS

| JP | 60-125443 A | 7/1985 |
| JP | 60-136642 A | 7/1985 |
| JP | 60-167672 A | 8/1985 |
| JP | 62-30307 B2 | 7/1987 |
| JP | 3-3654 A | 1/1991 |
| JP | 6-5981 B2 | 1/1994 |
| JP | 4511635 B1 | 7/2010 |

* cited by examiner

ACTUATOR

TECHNICAL FIELD

The present invention relates to an actuator including a differential gear deceleration mechanism.

Priority is claimed on Japanese Patent Application No. 2012-188662, filed Aug. 29, 2012, the content of which is incorporated herein by reference.

BACKGROUND ART

There is an actuator including a motor and a deceleration mechanism. In addition, in the deceleration mechanism, as a deceleration mechanism that can obtain a high speed reduction ratio, for example, there is a differential gear deceleration mechanism disclosed in Patent Literature 1.

The differential gear deceleration mechanism has an input shaft connected to an output shaft of a motor and rotated therewith, a wobbling crown gear having a central axis wobbling about a rotation axis of the input shaft through rotation of the input shaft, a stationary crown gear fixed to a casing surrounding the rotation axis and meshed with the wobbling crown gear, an pressing mechanism attached to the input shaft and configured to press the wobbling crown gear toward the stationary crown gear, an output shaft rotatably supported by the casing surrounding the rotation axis, and an elastically deformable spoke configured to connect the wobbling crown gear and the output shaft.

In the differential gear deceleration mechanism, the number of teeth of the wobbling crown gear is different from the number of teeth of the stationary crown gear. For this reason, even when the wobbling crown gear is pressed toward the stationary crown gear by the pressing mechanism, only some of teeth of the wobbling crown gear are meshed with the stationary crown gear, and a central axis of the wobbling crown gear is inclined with respect to the rotation axis. Accordingly, the wobbling crown gear wobbles about the rotation axis with rotation of the input shaft.

In the differential gear deceleration mechanism, for example, when the number of teeth of the stationary crown gear is N and the number of teeth of the wobbling crown gear is (N−1), a speed reduction ratio, which is a ratio (1/N) of a difference in the number of teeth (1) of the gears to the number of teeth (N) of the stationary crown gear is obtained. In this way, since the differential gear deceleration mechanism is compact and lightweight and still obtains a high speed reduction ratio, for example, the mechanism is widely used for a finger joint of a robot hand or the like.

CITATION LIST

Patent Literature

[Patent Literature 1] Japanese Patent Registration No. 4511635

SUMMARY OF INVENTION

Technical Problem

The differential gear deceleration mechanism disclosed in Patent Literature 1 is compact and lightweight as described above. However, when an assembly of the differential gear deceleration mechanism and the motor is used as an actuator, a length in an axial direction in which the rotation axis of the differential gear deceleration mechanism extends is relatively long. For this reason, in this industrial field, a smaller actuator is required. In particular, in robotics companies, this requirement is important.

Further, when the assembly of the differential gear deceleration mechanism and the motor is used as the actuator, a decrease in power loss generated from meshing between the wobbling crown gear and the stationary crown gear is also required.

Here, in consideration of the above-mentioned circumstances, the present invention is directed to provide an actuator capable of enabling miniaturization and a decrease in power loss.

Solution to Problem

In order to accomplish the above-mentioned objects of an aspect according to the present invention, there is provided an actuator including: an output member having an output shaft rotated about a rotation axis thereof; a stationary gear disposed at one side in an axial direction in which the rotation axis extends with respect to the output member and having a plurality of teeth disposed in parallel in a circumferential direction about the rotation axis; a wobbling gear disposed between the output member and the stationary gear, having a central axis tiltable with respect to the rotation axis, a different number of teeth from the stationary gear axis which formed in parallel in a circumferential direction about the central axis, and meshing with the stationary gear; a plurality of drivers disposed at the one side in the axial direction with respect to the wobbling gear, disposed in parallel in the circumferential direction about the rotation axis, configured to axially displace a corresponding portion of the wobbling gear in the circumferential direction, and configured to incline the central axis of the wobbling gear with respect to the rotation axis; and a stopper configured to restrict a meshing depth of a tooth of the wobbling gear meshed with any one of the plurality of teeth of the stationary gear by coming in contact with a portion of the wobbling gear and restricting inclination of the wobbling gear during a wobbling process of the wobbling gear, wherein the central axis rotates about the rotation axis while the central axis is inclined with respect to the rotation axis, as the plurality of drivers are sequentially driven in the sequence in which they are disposed in parallel in the circumferential direction, wherein the output member is engaged with the wobbling gear to be rotated about the rotation axis according to turning of the wobbling gear about the central axis in the wobbling process.

When one driver of the plurality of drivers is driven, a portion of the wobbling gear corresponding to the driver in the circumferential direction is displaced, for example, to one side in the axial direction, and the central axis of the wobbling gear is inclined with respect to the rotation axis. Then, any one of the plurality of teeth of the wobbling gear is meshed with the stationary gear.

Here, the drivers are sequentially driven in the sequence in which they are disposed in parallel in the circumferential direction. For this reason, the teeth of the plurality of teeth of the wobbling gear meshed with the stationary gear are sequentially shifted in the circumferential direction. Here, the central axis of the wobbling gear is rotated about the rotation axis while the central axis is inclined with respect to the rotation axis. That is, the wobbling gear wobbles about the rotation axis.

Here, the number of teeth of the wobbling gear is different from the number of teeth of the stationary gear. For this reason, even when the teeth of the plurality of teeth of the wobbling gear meshed with the stationary gear are sequentially shifted in the circumferential direction and the specific teeth of the wobbling gear are meshed with the teeth of the stationary gear, the specific teeth are meshed with the teeth different from the previously meshed teeth of the plurality of teeth of the stationary gear. Accordingly, the wobbling gear turns about the central axis. Then, the output member is rotated about the rotation axis according with the turning of the wobbling gear.

In the actuator, as a portion of the wobbling gear comes in contact with the stopper, an inclination angle of the wobbling gear upon the wobbling process is maintained at a predetermined angle, and a meshing depth of the wobbling gear and the stationary gear becomes an appropriate depth. For this reason, in the actuator, power loss in the meshing of the gears can be suppressed.

In addition, in the actuator, since the plurality of drivers serving as the motor in Patent Literature 1 are disposed in a region occupied by the attachment mechanism in the differential gear deceleration mechanism disclosed in Patent Literature 1, a length in the axial direction can be reduced and the actuator can be miniaturized.

Here, in the actuator according to the aspect, the wobbling gear may be formed of a ferromagnetic material, and the driver may be an electromagnet.

In this case, all of the plurality of electromagnets may not come in contact with the wobbling gear as inclination of the wobbling gear is restricted by the stopper.

In the actuator, since the driver and the wobbling gear are not in contact with each other, noise due to contact therebetween can be eliminated.

In addition, in the actuator according to the aspect, the driver may be a hydraulic piston, a pneumatic piston, or an electromagnetic piston.

In addition, in the actuator according to any one of the above-mentioned aspects, the stopper may be formed in an annular shape about a rotation axis thereof.

In addition, in the actuator according to any one of the above-mentioned aspects, the stopper may be disposed outside in a radial direction of an annular row of teeth constituted by a plurality of teeth of the wobbling gear disposed in parallel in the circumferential direction. In addition, the stopper may be disposed inside in a radial direction of an annular row of teeth constituted by a plurality of teeth of the wobbling gear disposed in parallel in the circumferential direction.

In addition, in the actuator according to any one of the above-mentioned aspects, a support configured to support the wobbling gear such that the central axis of the wobbling gear is tiltable with respect to the rotation axis, the central axis is rotatable about the rotation axis, and the wobbling gear is turnable about the central axis may be provided. In this case, the support may be a self-aligning unit configured to connect a portion of the wobbling gear on the central axis and a portion of the stationary gear on the rotation axis.

In the actuator, the wobbling gear can stably and smoothly wobble about the rotation axis, and can turn about the central axis.

In addition, in the actuator according to any one of the above-mentioned aspects, the output member may have an output gear fixed to the output shaft and having a plurality of teeth disposed about the rotation axis in parallel in the circumferential direction, and a plurality of teeth disposed about the central axis in parallel in the circumferential direction and configured to mesh with the output gear may be formed at the wobbling gear. In this case, the number of teeth of the output gear may be different from the number of teeth of the wobbling gear meshed with the output gear.

In the actuator, as the difference between the number of teeth of the stationary gear and the number of teeth of the wobbling gear meshed with the stationary gear and the difference between the number of teeth of the output gear and the number of teeth of the wobbling gear meshed with the output gear are appropriately varied, a variation in the set number of revolutions of the output shaft can be enriched.

In addition, in order to accomplish the above-mentioned objects, according to another aspect of the present invention, there is provided an actuator including: an output shaft rotated about a rotation axis thereof; an output gear fixed to the output shaft and having a plurality of teeth formed in parallel in a circumferential direction about the rotation axis; a stationary gear disposed at one side in an axial direction in which the rotation axis extends with respect to the output gear, and having a plurality of teeth formed in parallel in the circumferential direction about the rotation axis; a wobbling gear disposed between the output member and the stationary gear, having a central axis tiltable with respect to the rotation axis, a plurality of input-side teeth disposed in parallel in the circumferential direction about the central axis and meshed with the stationary gear, and a plurality of output-side teeth meshed with the output gear in parallel in the circumferential direction; a plurality of drivers disposed at the one side in the axial direction with respect to the wobbling gear, disposed in parallel in the circumferential direction about the rotation axis, configured to axially displace a corresponding portion of the wobbling gear in the circumferential direction; and a stopper configured to restrict a meshing depth of the input-side teeth of the wobbling gear meshed with any one of the plurality of teeth of the stationary gear and a meshing depth of the output-side teeth of the wobbling gear meshed with any one of the plurality of teeth of the output gear, by coming in contact with a portion of the wobbling gear and restricting inclination of the wobbling gear during a wobbling process of the wobbling gear, wherein the central axis rotates about the rotation axis while the central axis is inclined with respect to the rotation axis, as the plurality of drivers are sequentially driven in the sequence in which they are disposed in parallel in the circumferential direction, wherein at least one of a difference between the number of teeth of the stationary gear and the number of the input-side teeth in the wobbling gear and a difference between the number of the output-side teeth in the wobbling gear and the number of teeth of the output gear is 1 or more.

Even in the actuator, like the actuator described above, as a portion of the wobbling gear comes in contact with the stopper, power loss in the meshing between the gears can be suppressed. Further, even in the actuator, since the plurality of drivers serving as the motor disclosed in Patent Literature 1 are disposed in the region occupied by the attachment mechanism in the differential gear deceleration mechanism disclosed in Patent Literature 1, a length in the axial direction can be reduced and the actuator can be miniaturized.

In addition, in the actuator, as the difference between the number of teeth of the stationary gear and the number of the input-side teeth in the wobbling gear and the difference between the number of teeth of the output gear and the number of the output-side teeth in the wobbling gear are appropriately varied, a variation in the set number of revolutions of the output shaft can be enriched.

Further, in the actuator, like the actuator described above, the driver may be an electromagnet, a hydraulic piston, a pneumatic piston, or an electromagnetic piston. In addition, when the driver is the electromagnet, the plurality of electromagnets may not come in contact with the wobbling gear as the inclination of the wobbling gear is restricted by the stopper.

In addition, in the actuator, the stopper may be formed in an annular shape about the rotation axis. In this case, the stopper may be disposed outside in the radial direction of the annular row of teeth constituted by the plurality of teeth disposed in parallel in the circumferential direction of the wobbling gear, or may be disposed inside in the radial direction thereof.

Further, in the actuator, the support configured to support the wobbling crown gear may be provided such that the central axis of the wobbling gear is tiltable with respect to the rotation axis, the central axis is rotatable about the rotation axis, and the wobbling gear is turnable about the central axis. In this case, the support may be a self-aligning unit configured to connect a portion of the wobbling gear on the central axis and a portion of the stationary gear on the rotation axis.

Advantageous Effects of Invention

According to an aspect of the present invention, the actuator can be miniaturized and power loss can be decreased.

DESCRIPTION OF EMBODIMENT

Hereinafter, an embodiment of the present invention will be described in detail with reference to the accompanying drawings. Further, the present invention is not limited by the embodiment. In addition, components of the following embodiment include components that can be easily assumed by those skilled in the art, or substantially the same components.

Figure 1:
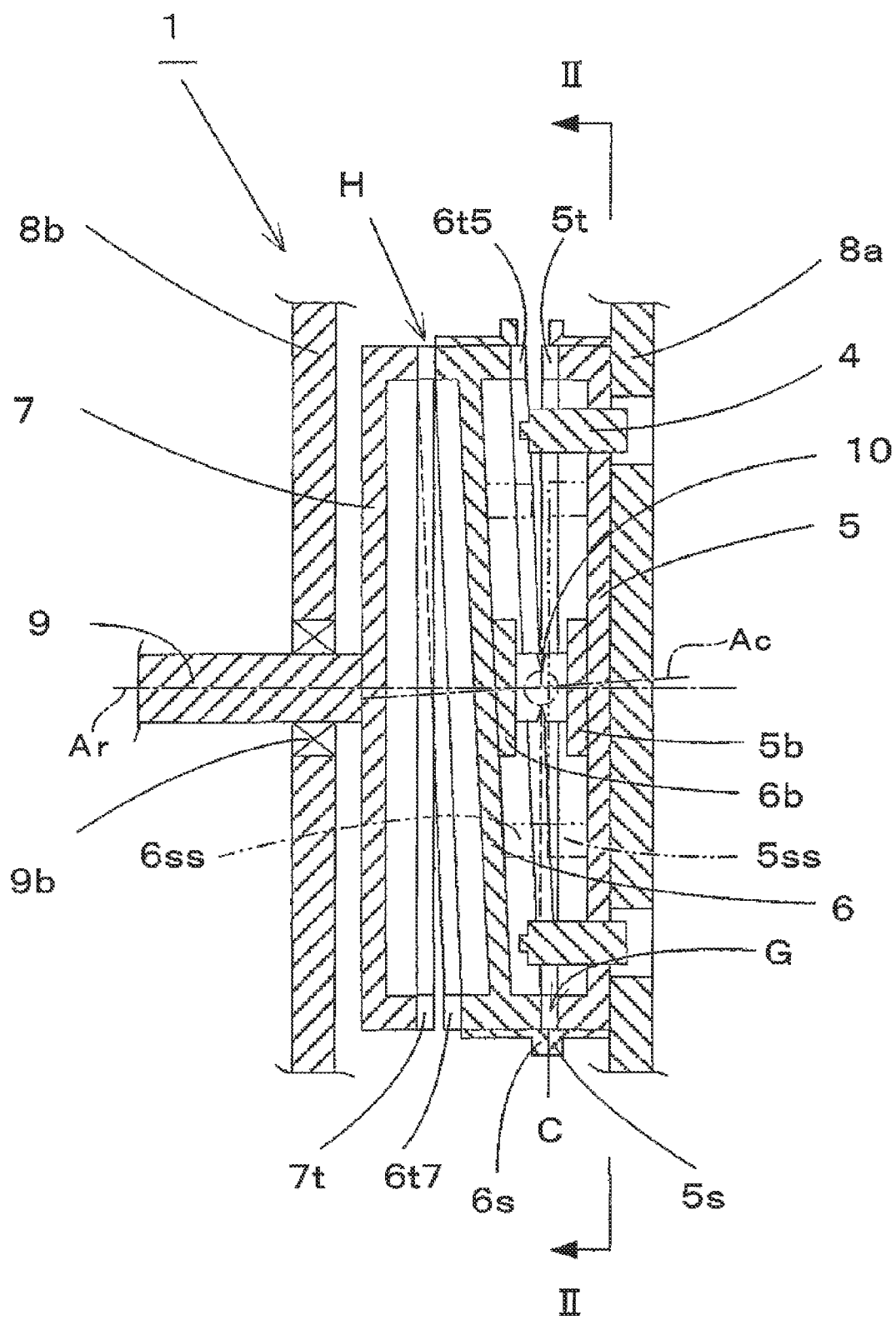
FIG. 1 is a cross-sectional view of an actuator according to an embodiment of the present invention.

As shown in FIG. 1, an actuator 1 of an embodiment includes an output shaft 9 rotated about a rotation axis Ar, an output crown gear 7 fixed to the output shaft 9, a stationary crown gear 5 disposed at an input side, which is one side in the axial direction in which the rotation axis Ar extends with respect to the output crown gear 7, a wobbling crown gear 6 disposed between the output crown gear 7 and the stationary crown gear 5, a plurality of drivers 4 disposed at the input side with respect to the wobbling crown gear 6 and configured to displace a portion of the wobbling crown gear 6 in the axial direction, a self-aligning unit 10 configured to tiltably support the wobbling crown gear 6, a stopper 5s configured to restrict inclination of the wobbling crown gear 6, and casings 8a and 8b configured to cover the stationary crown gear 5, the wobbling crown gear 6, the output crown gear 7 and the self-aligning unit 10. Further, hereinafter, an opposite side from the input side in the axial direction is referred to as an output side.

The output shaft 9 is rotatably supported by an output-side lid 8b of the casings 8a and 8b about the rotation axis Ar via a bearing 9b. X (for example, (M−1)) teeth 7t are formed in parallel in the circumferential direction about the rotation axis Ar at the output crown gear 7 fixed to the output shaft 9. In the embodiment, an output member is constituted by the output shaft 9 and the output crown gear 7.

at the output crown gear 7 fixed to the output shaft 9

Ys (for example, (N−1)) teeth 5t are formed in parallel in the circumferential direction about the rotation axis Ar at the stationary crown gear 5. The stationary crown gear 5 has a main body section at which the teeth 5t are formed, and an attachment plate section 5b fixed to an output-side surface of the main body section on the rotation axis Ar. The stationary crown gear 5 has an input-side surface of the main body section fixed to an input-side lid 8a of the casings 8a and 8b.

Y (for example, N) input-side teeth 6t5 disposed in parallel in the circumferential direction about the central axis Ac and meshed with the stationary crown gear 5, and Xs (for example, M) output-side teeth 6t7 disposed in parallel in the circumferential direction and meshed with the output crown gear 7 are formed at the wobbling crown gear 6.

The wobbling crown gear 6 has a main body section at which the input-side teeth 6t5 and the output-side teeth 6t7 are formed, an annular stopper receiving section 6s fixed to an outer circumferential edge of the main body section and in contact with the stopper 5s, and an attachment plate section 6b disposed at a position on the central axis Ac of the main body section and fixed to the input-side surface. The input-side teeth 6t5 is formed at the input side of the main body section, and the output-side teeth 6t7 is formed at the output side of the main body section. The main body section is formed of a ferromagnetic material.

A portion of the wobbling crown gear 6 on the central axis Ac is connected to a portion of the stationary crown gear 5 on the rotation axis Ar by the self-aligning unit 10. More specifically, the attachment plate section 6b of the wobbling crown gear 6 and the attachment plate section 5b of the stationary crown gear 5 are connected by the self-aligning unit 10. The self-aligning unit 10f supports the wobbling crown gear 6 such that the central axis Ac of the wobbling crown gear 6 is tiltable with respect to the rotation axis Ar and the central axis Ac is rotatable about the rotation axis Ar. Further, the self-aligning unit 10 turnably supports the wobbling crown gear 6 to be immovable in the radial direction and the axial direction of the rotation axis Ar while supporting the wobbling crown gear 6 to be rotatable about the central axis Ac. As the self-aligning unit 10, for example, various types such as a spherical bearing type, a self-aligning roller bearing type, a self-aligning ball bearing type, and so on, may be provided as long as the above-mentioned functions are exhibited.

Figure 2:
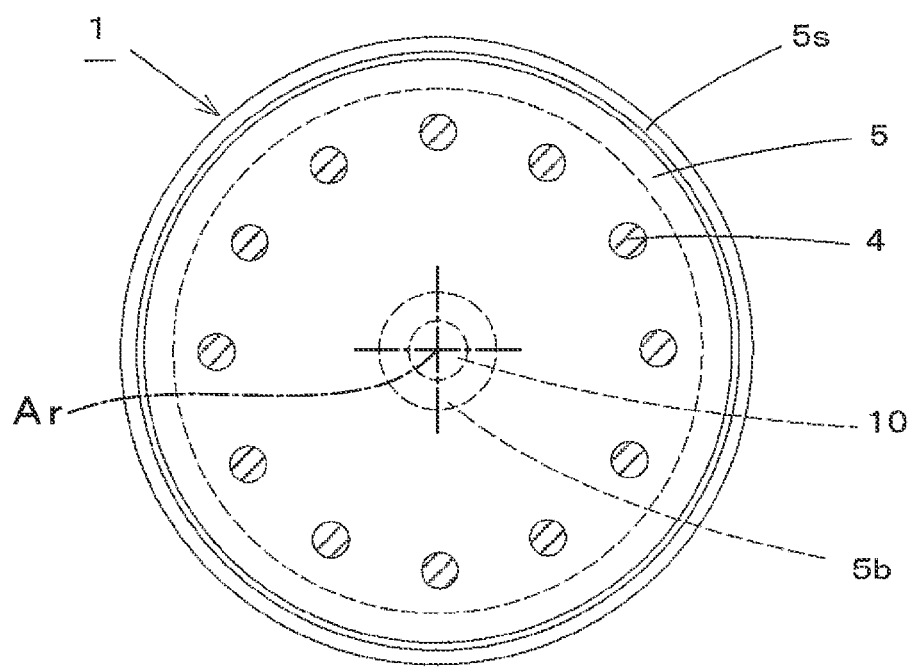
FIG. 2 is a cross-sectional view taken along line II-II of FIG. 1.

In the embodiment, the driver 4 is an electromagnet. As shown in FIGS. 1 and 2, the plurality of drivers 4 have magnetic force generating ends directed toward the output side in the axial direction, disposed around the rotation axis Ar in the circumferential direction at equal intervals, and fixed to the main body section of the stationary crown gear 5 or the input-side lid 8a of the casings 8a and 8b. As each of the plurality of drivers 4 is driven, a corresponding portion of the wobbling crown gear 6 in the circumferential direction formed of a ferromagnetic material is displaced in the axial direction.

The stopper 5s having an annular shape is fixed to the outer circumferential edge of the main body section of the stationary crown gear 5 or the input-side lid 8a of the casings 8a and 8b to be opposite to the stopper receiving section 6s of the wobbling crown gear 6 in the axial direction.

Further, in the embodiment, the differential gear deceleration mechanism is constituted by the stationary crown gear 5, the wobbling crown gear 6 and the output crown gear 7.

Next, an action of the actuator 1 according to the embodiment will be described.

When the one driver 4 of the plurality of drivers 4 is driven, a portion of the main body section of the wobbling crown gear 6 corresponding to the driver 4 in the circumferential direction (hereinafter referred to as a suction section) is electromagnetically attracted, and the suction section is displaced toward the input side in the axial direction. As a result, a portion of the main body section of the wobbling crown gear 6 at a symmetrical position of the suction section with reference to the central axis Ac (hereinafter referred to as a suction symmetrical section) is displaced to the output side in the axial direction. According to the displacement, the input-side teeth 6t5 of a section G of the suction section side in the plurality of input-side teeth 6t5 of the wobbling crown gear 6 is meshed with the stationary crown gear 5. Further, the output-side teeth 6t7 of a section H of the suction symmetrical section side in the plurality of output-side teeth 6t7 of the wobbling crown gear 6 is meshed with the output crown gear 7.

Here, the central axis Ac of the wobbling crown gear 6 is inclined with respect to the rotation axis Ar. However, as the stopper receiving section 6s of the wobbling crown gear 6 comes in contact with the stopper 5s, an inclination angle of the wobbling crown gear 6 is maintained at a predetermined angle while the suction section of the wobbling crown gear 6 does not come in contact with the driver 4. In the embodiment, at a point at which the inclination angle of the wobbling crown gear 6 is the predetermined angle, a meshing depth between the wobbling crown gear 6 and the stationary crown gear 5 and a meshing depth between the wobbling crown gear 6 and the output crown gear 7 are appropriate depths.

Here, the plurality of drivers 4 disposed in parallel in the circumferential direction are driven in sequence in parallel in the circumferential direction according to instruction from a control device (not shown). For this reason, a rotating magnetic field rotating about the rotation axis Ar is generated in the casings 8a and 8b. As a result, the suction section and the suction symmetrical section of the wobbling crown gear 6 are sequentially driven about the rotation axis Ar in the circumferential direction. In addition, in the plurality of input-side teeth 6t5 of the wobbling crown gear 6, the input-side teeth 6t5 meshed with the stationary crown gear 5 are sequentially shifted in the circumferential direction. Further, in the plurality of output-side teeth 6t7 of the wobbling crown gear 6, the output-side teeth 6t7 meshed with the output crown gear 7 are also shifted in the circumferential direction. Here, the central axis Ac of the wobbling crown gear 6 is rotated about the rotation axis Ar while the central axis Ac is inclined with respect to the rotation axis Ar. That is, the wobbling crown gear 6 wobbles about the rotation axis Ar.

Here, as described above, the number of the input-side teeth 6t5 in the wobbling crown gear 6 is different from the number of teeth of the stationary crown gear 5. For this reason, in the plurality of input-side teeth 6t5 of the wobbling crown gear 6, even when the input-side teeth 6t5 meshed with the stationary crown gear 5 are sequentially shifted in the circumferential direction and even when the specific input-side teeth 6t5 of the wobbling crown gear 6 are meshed with the teeth 5t of the stationary crown gear 5 again, the specific input-side teeth 6t5 are meshed with different teeth 5t from the previously meshed teeth 5t of the plurality of teeth 5t of the stationary crown gear 5. Specifically, the specific input-side teeth 6t5 of the wobbling crown gear 6 are meshed with the teeth 5t shifted from the previously meshed teeth 5t, in the plurality of teeth 5t of the stationary crown gear 5, by a finite difference (Y−Ys) (for example, 1=N−(N−1)) between the number Y (for example, N) of the input-side teeth 6t5 in the wobbling crown gear 6 and the number of teeth Ys (for example, (N−1)) of the stationary crown gear 5.

In addition, as described above, the number of the output-side teeth 6t7 in the wobbling crown gear 6 is different from the number of teeth of the output crown gear 7. For this reason, the output crown gear 7 is also rotated a different number of revolutions from the wobbling crown gear 6.

As a result, when the number of revolutions of the rotating magnetic field is θ, the number of revolutions θ7 of the output crown gear 7 is represented as the following equation.

$$\theta 7 = \{1 - (Xs \cdot Ys)/(X \cdot Y)\} \cdot \theta$$

In addition, when the number Y of the input-side teeth 6t5 in the wobbling crown gear 6 is for example N, the number of teeth Ys of the stationary crown gear 5 is for example (N−1), the number of teeth X of the output crown gear 7 is (M−1), and the number Xs of the output-side gear 6t7 of the wobbling crown gear 6 is M, the number of revolutions θ7 of the output crown gear 7 is represented as the following equation. In addition, both the rotation direction of the wobbling crown gear and the rotation direction of the output crown gear become the rotation direction of the rotating magnetic field.

$$\theta 7 = [(M-N)/\{N \cdot (M-1)\}] \cdot \theta$$

Accordingly, a speed reduction ratio of the output shaft 9 with respect to rotation of the rotating magnetic field is $1-(Xs \cdot Ys)/(X \cdot Y)$ (for example, $(M-N)/\{N \cdot (M-1)\}$). Accordingly, in the embodiment, a high speed reduction ratio with respect to rotation of the rotating magnetic field can be obtained.

Further, in the embodiment, it is provided that the number of teeth of the stationary crown gear 5 is (N−1), the number of the input-side teeth 6t5 in the wobbling crown gear 6 is N, the number of the output-side teeth 6t7 in the wobbling crown gear 6 is M and the number of teeth of the output crown gear 7 is (M−1). However, the present invention is not limited thereto. Specifically, the number of the input-side teeth 6t5 of the wobbling crown gear 6 may be larger than the number of teeth of the stationary crown gear 5 by two or more, and the number of teeth of the output crown gear 7 may be smaller than the number of the output-side teeth 6t7 of the wobbling crown gear 6 by two or more. In addition, on the other hand, the number of the input-side teeth 6t5 of the wobbling crown gear 6 may be smaller than the number of teeth of the stationary crown gear 5, and the number of teeth of the output crown gear 7 may be larger than the number of the output-side teeth 6t7 of the wobbling crown gear 6. In this case, the wobbling crown gear 6 is rotated (turned) in a reverse direction of the rotation direction of the rotating magnetic field, and the output crown gear 7 is rotated in a reverse direction of the rotation (turning) of the wobbling crown gear 6. Further, one of a difference between the number of teeth of the stationary crown gear 5 and the number of the input-side teeth 6t5 in the wobbling crown gear 6 and a difference between the number of the output-side teeth 6t7 in the wobbling crown gear 6 and the number of teeth of the output crown gear 7 may be 0.

Accordingly, in the embodiment, as the difference between the number of teeth of the stationary crown gear 5 and the number of the input-side teeth 6t5 in the wobbling crown gear 6 and the difference between the number of the output-side teeth 6t7 in the wobbling crown gear 6 and the number of teeth of the output crown gear 7 are appropriately varied, a variation in a speed reduction ratio of the output shaft 9 with respect to rotation of the rotating magnetic field can be enriched.

In addition, in the embodiment, as described above, the self-aligning unit 10 supports the wobbling crown gear 6 such that the central axis Ac of the wobbling crown gear 6 can be inclined with respect to the rotation axis Ar and the central axis Ac can be rotated about the rotation axis Ar. Further, the self-aligning unit 10 immovably supports the wobbling crown gear 6 in the radial direction and the axial direction of the rotation axis Ar while supporting the wobbling crown gear 6 to be turnable about the central axis Ac. For this reason, the wobbling crown gear 6 wobbles about the rotation axis Ar and turns about the central axis Ac stably and smoothly with respect to rotation of the rotating magnetic field.

In addition, in the embodiment, as described above, even when the wobbling crown gear 6 is inclined due to the electromagnetic attraction by the driver 4, the inclination angle is maintained at a predetermined angle by the stopper 5s. For this reason, in the embodiment, a meshing depth between the wobbling crown gear 6 and the stationary crown gear 5 and a meshing depth between the wobbling crown gear 6 and the output crown gear 7 become appropriate depths. Accordingly, in the embodiment, it is possible to suppress power loss in meshing between the gears 5, 6 and 7.

In addition, in the embodiment, even when the plurality of drivers 4 disposed in parallel in the circumferential direction are sequentially driven in the sequence in which they are disposed in parallel, inclination of the wobbling crown gear 6 is restricted by the stopper 5s, and the wobbling crown gear 6 and the plurality of drivers 4 do not come in intermittent contact with each other. Meanwhile, in the embodiment, the wobbling crown gear 6 and annular the stopper 5s are in continuous contact with each other while the plurality of drivers 4 disposed in parallel in the circumferential direction are sequentially driven in the parallelly disposed sequence. For this reason, in the embodiment, even when the plurality of drivers 4 disposed in parallel in the circumferential direction are sequentially driven in the parallelly disposed sequence, generation of the intermittent contact sound between the members can be suppressed.

In addition, in the embodiment, since the plurality of drivers 4 serving as motors in Patent Literature 1 are disposed in a region occupied by an attachment mechanism in the differential gear deceleration mechanism disclosed in Patent Literature 1, the length in the axial direction can be reduced, and the actuator can be miniaturized.

Further, in the embodiment, the stopper receiving section 6s is installed at an outer circumferential side of the main body section of the wobbling crown gear 6, i.e., an outer circumferential side of an annular row of the input-side teeth 6t5 in the wobbling crown gear 6, and the stopper 5s is installed to oppose the stopper receiving section 6s. However, in FIG. 1, as shown by an imaginary line, the stopper receiving section Ess is installed at an inner circumferential side of an annular row of the input-side teeth 6t5 of the wobbling crown gear 6, and the stopper 5ss may be formed to oppose the stopper receiving section 6ss.

In addition, in the embodiment, while the electromagnet is used as the driver 4, a hydraulic piston, a pneumatic piston, an electromagnetic piston, or the like, may be used instead of the electromagnet. However, since these pistons cannot incline the wobbling crown gear 6 when an operating end of the piston does not come in contact with the wobbling crown gear 6, when the piston is driven, a contact sound with the wobbling crown gear 6 is generated.

In addition, in the embodiment, crown gears are employed as each of the gears 5, 6 and 7. However, each of the gears may be any one of, for example, a bevel gear or a face gear as long as the gears can be meshed with each other in the axial direction.

In addition, in the embodiment, an output member is constituted by the output crown gear 7 and the output shaft 9. However, the output crown gear 7 may not be provided in the output member. In this case, since turning of the wobbling crown gear 6 having the central axis Ac inclined with respect to the rotation axis Ar is applied to the output shaft 9, as disclosed in Patent Literature 1, the wobbling crown gear 6 and the output shaft 9 may be connected by an elastic member. In addition, the wobbling crown gear 6 and the output shaft 9 may be connected by a spline structure such that the output shaft 9 cannot be relatively rotated with respect to the wobbling crown gear 6 while allowing inclination of the wobbling crown gear 6 with respect to the output shaft 9.

INDUSTRIAL APPLICABILITY

According to the aspect of the present invention, the actuator can be miniaturized and power loss can be reduced.

Reference Signs List

1 actuator
4 driver
5 stationary crown gear
5s stopper
5t teeth (of stationary crown gear)
6 wobbling crown gear
6s stopper receiving section
6t5 input-side teeth (of wobbling crown gear)
6t7 output-side teeth (of wobbling crown gear)
7 output crown gear
7t teeth (of output crown gear)
8a input-side lid
8b output-side lid
9 output shaft
10 self-aligning unit
Ar rotation axis Ar
Ac central axis Ac

The invention claimed is:

1. An actuator comprising:
   an output member having an output shaft rotated about a rotation axis thereof;
   a stationary gear disposed at one side in an axial direction in which the rotation axis extends with respect to the output member and having a plurality of teeth disposed in parallel in a circumferential direction about the rotation axis;
   a wobbling gear disposed between the output member and the stationary gear, having a central axis tiltable with respect to the rotation axis, a different number of teeth from the stationary gear which formed in parallel in a circumferential direction about the central axis, and meshing with the stationary gear;
   a plurality of drivers disposed at the one side in the axial direction with respect to the wobbling gear, disposed in parallel in the circumferential direction about the rotation axis, configured to axially displace a corresponding portion of the wobbling gear in the circumferential direction, and configured to incline the central axis of the wobbling gear with respect to the rotation axis; and a stopper configured to restrict a meshing depth of a tooth of the wobbling gear meshed with any one of the plurality of teeth of the stationary gear by coming in contact with a portion of the wobbling gear and restricting inclination of the wobbling gear during a wobbling process of the wobbling gear, wherein the central axis rotates about the rotation axis while the central axis is inclined with respect to the rotation axis, as the plurality of drivers are sequentially driven in the sequence in which they are disposed in parallel in the circumferential direction, wherein the output member is engaged with the wobbling gear to be rotated about the rotation axis according to turning of the wobbling gear about the central axis in the wobbling process, and wherein the stopper is disposed outside in a radial direction of an annular row of teeth constituted by a plurality of teeth of the wobbling gear disposed in parallel in the circumferential direction.

2. The actuator according to claim 1, wherein the wobbling gear is formed of a ferromagnetic material, and
the driver is an electromagnet.

3. The actuator according to claim 2, wherein all of the plurality of electromagnets do not come in contact with the wobbling gear as inclination of the wobbling gear is restricted by the stopper.

4. The actuator according to claim 1, wherein the driver is a hydraulic piston.

5. The actuator according to claim 1, wherein the driver is a pneumatic piston.

6. The actuator according to claim 1, wherein the stopper is formed in an annular shape about the rotation axis thereof.

7. The actuator according to claim 1, wherein a support configured to support the wobbling gear such that the central axis of the wobbling gear is tiltable with respect to the rotation axis, the central axis is rotatable about the rotation axis, and the wobbling gear is turnable about the central axis is provided.

8. The actuator according to claim 7, wherein the support is a self-aligning unit configured to connect a portion of the wobbling gear on the central axis and a portion of the stationary gear on the rotation axis.

9. The actuator according to claim 1, wherein the output member has an output gear fixed to the output shaft and having a plurality of teeth disposed about the rotation axis in parallel in the circumferential direction, and a plurality of teeth disposed about the central axis in parallel in the circumferential direction and configured to mesh with the output gear are formed at the wobbling gear.

10. The actuator according to claim 9, wherein the number of teeth of the output gear is different from the number of teeth of the wobbling gear meshed with the output gear.

11. An actuator comprising:

an output shaft rotated about a rotation axis thereof;

an output gear fixed to the output shaft and having a plurality of teeth formed in parallel in a circumferential direction about the rotation axis;

a stationary gear disposed at one side in an axial direction in which the rotation axis extends with respect to the output gear, and having a plurality of teeth formed in parallel in the circumferential direction about the rotation axis;

a wobbling gear disposed between the output member and the stationary gear, having a central axis tiltable with respect to the rotation axis, a plurality of input-side teeth disposed in parallel in the circumferential direction about the central axis and meshed with the stationary gear, and a plurality of output-side teeth meshed with the output gear in parallel in the circumferential direction;

a plurality of drivers disposed at the one side in the axial direction with respect to the wobbling gear, disposed in parallel in the circumferential direction about the rotation axis, configured to axially displace a corresponding portion of the wobbling gear in the circumferential direction; and a stopper configured to restrict a meshing depth of the input-side teeth of the wobbling gear meshed with any one of the plurality of teeth of the stationary gear and a meshing depth of the output-side teeth of the wobbling gear meshed with any one of the plurality of teeth of the output gear, by coming in contact with a portion of the wobbling gear and restricting inclination of the wobbling gear during a wobbling process of the wobbling gear, wherein the central axis rotates about the rotation axis while the central axis is inclined with respect to the rotation axis, as the plurality of drivers are sequentially driven in the sequence in which they are disposed in parallel in the circumferential direction, wherein at least one of a difference between the number of teeth of the stationary gear and the number of the input-side teeth in the wobbling gear and a difference between the number of the output-side teeth in the wobbling gear and the number of teeth of the output gear is 1 or more, and wherein the stopper is disposed outside in a radial direction of an annular row of teeth constituted by the plurality of input-side teeth of the wobbling gear disposed in parallel in the circumferential direction.

* * * * *